United States Patent Office 3,691,075
Patented Sept. 12, 1972

3,691,075
PROCESS FOR PREPARING BARIUM-CONTAINING DISPERSION
Roy C. Sias, Ponca City, Okla., assignor to Continental Oil Company, Ponca City, Okla.
No Drawing. Continuation-in-part of application Ser. No. 826,708, May 21, 1969. This application Aug. 31, 1970, Ser. No. 68,566
Int. Cl. C10m 1/40, 1/24
U.S. Cl. 252—33
34 Claims

ABSTRACT OF THE DISCLOSURE

Process for preparing a highly basic barium-containing dispersion wherein the process comprises: (a) forming an admixture of oil-soluble dispersing agent (e.g. sulfonic acid), nonvolatile diluent, process solvent and water, (b) adding to the admixture a solution of basic barium compound (e.g. BaO) in an alcohol (e.g. methanol or methoxy ethanol)—from about 55 to less than about 90%, preferably from about 65 to about 75%, of the total requirement is added, (c) passing $CO_2$ through the admixture, (d) adding to the carbonated admixture a solution of basic barium compound in alcohol (remainder of the requirement), (e) removing volatiles and (f) carbonating the admixture.

The salient features of the process are (1) adding from about 55 to less than about 90%, preferably from about 65 to about 75%, of the alcoholic solution of basic barium compound prior to carbonation and (2) the temperature at which the first carbonation is conducted.

CROSS-REFERENCE TO RELATED APPLICATIONS

The present application is a continuation-in-part of application Ser. No. 826,708, filed May 21, 1969, and now abandoned.

DISCLOSURE

Background

The present invention relates to an improved process for preparing a composition comprising a dispersion of barium carbonate in a nonvolatile diluent. The composition has an unusually high concentration of barium carbonate. Compositions of this general type are known by various names such as "overbased" dispersions and "highly basic" dispersions.

Many uses are known for highly basic barium dispersions. They are particularly useful in lubricating oil compositions for use in diesel and other internal combustion engines. More recently, they have been used as smoke suppressant additives in diesel fuels. Generally, the highly basic barium dispersions which have been used as smoke suppressant additives contain large amounts (e.g. above about 20 percent) dispersed barium compounds. Since the product of the process of my invention contains a high concentration of barium carbonate it is particularly useful as a smoke suppressant additive in diesel fuels.

Two methods of stating the amount of dispersed barium compounds (e.g. barium carbonate or barium hydroxide) have been used in this field. One method states the dispersed barium carbonate as the "base number" which refers to milligrams of potassium hydroxide per gram of sample. Preferably the base number is an acetic base number referring to an acetic acid titration method which utilizes glacial acetic acid as the solvent and a solution of perchloric acid in glacial acetic acid as the titrant.

A second method uses the term "metal ratio" which is defined as the ratio of the total equivalents of barium in the composition to the equivalents of barium theoretically combinable as a normal salt with the organic acid (e.g. sulfonic acid) present. Metal ratio is thus a measure of the stoichiometric excess of barium in the composition.

The "base number" method is preferred herein since it is relatively easy to determine and it is independent of the "percent active" of the sulfonic acid.

PRIOR ART

Robert L. Carlyle in U.S. 2,861,951 teaches a process for dispersing barium carbonate in a nonvolatile carrier wherein the process uses an aliphatic $C_1$–$C_3$ alcohol solution of an oil-insoluble barium inorganic base (e.g. barium oxide). The highest base number taught by Carlyle is 133.

Raymond C. Schlicht et al. in U.S. 3,057,896 teach a process for preparing hyperbasic sulfonates (including barium sulfonates) wherein the process uses a lower alkanol, water or a lower alkoxy ethanol. With regard to barium sulfonates, the highest metal ratio taught is 1.6.

British Pat. No. 1,108,661 teaches a process for preparing hyperbasic barium sulfonates wherein the process uses a glycol ether solution of barium oxide. In Example 17, a two-step procedure of adding the glycol ether solution of BaO is used. Ninety-five percent of the total requirement is added initially, after which the solution is carbonated. Then the remaining five percent of the glycol ether solution of BaO is added followed by carbonation. The product of this example had an acetic base number of 67.

Gerald L. Nield in U.S. 3,525,599 teaches a process for preparing a barium carbonate dispersion containing an unusually high concentration of barium carbonate. While this process uses an alcoholic solution of a basic barium compound, it requires the use of an amine salt of an oil-soluble organic acid (e.g. a sulfonic acid). Moreover, according to this process all of the alcoholic solution of basic barium compound is added to the initial admixture.

It is believed to be readily apparent that none of the foregoing teach the combination of steps which forms the process of my invention.

A search of the prior art produced the following U.S. patents as being representative of the art: 2,791,558; 2,846,466; 2,881,206; 2,961,403; 3,007,868; 3,170,880; 3,170,881; and 3,312,618. Inasmuch as these patents are of less pertinency than the references discussed in the foregoing it is not considered necessary to discuss them.

BRIEF SUMMARY OF MY INVENTION

Broadly stated, the present invention relates to a process for preparing a highly basic barium-containing dispersion wherein the process comprises:

(a) forming an admixture of an oil-soluble dispersing agent, nonvolatile diluent, process solvent and water,
(b) adding to the admixture an alcoholic solution of a basic barium compound (from about 55 to less than about 90% of the total requirement is added),
(c) passing $CO_2$ through the admixture while maintaining the temperature in a range of about 75 to about 95° C.,
(d) adding to the carbonated admixture an alcoholic solution of a basic barium compound (remainder of the requirement),
(e) removing volatile materials, and
(f) carbonating the admixture.

When the alcoholic solution of basic barium compound is an aliphatic monohydric alcohol, preferably the process comprises:

(a) forming an admixture of oil-soluble dispersing agent, nonvolatile diluent, and process solvent, (b) adding to the admixture an aliphatic monohydric alcohol solution of basic barium compound (from about 55 to less than about 80 percent of the total requirement is added), (c) heating the admixture to about 75° C. to about 95° C., (d) adding water to the admixture, (e) passing $CO_2$ through the admixture while maintaining the temperature at about 75° C. to about 95° C., (f) adding to the carbonated admixture an aliphatic monohydric alcohol solution of basic barium compound (remainder of requirement), (g) removing volatile materials, and (h) carbonating the admixture.

In some instances, the process includes the additional step of steam-stripping the product. Preferably, this steam-stripping is done concurrently with the second carbonation.

The important features of the process are (1) adding from about 55 to less than about 90% of the required amount of alcoholic solution of basic barium compound prior to carbonation and (2) conducting the first carbonation at a temperature of about 75 to about 95° C.

In one aspect the present invention relates to a lubricating composition containing an effective amount of the product prepared by the processes described in the foregoing.

In another aspect the present invention relates to a hydrocarbon fuel composition containing an effective amount of the product prepared by the processes described in the foregoing.

It should be emphasized at this time that the product of my invention is characterized as having a high base number (for example at least 140, preferably at least 180) while still being fluid at ambient temperatures.

DETAILED DESCRIPTION

Materials used

Suitable oil-soluble dispersing agents icnlude the oil-soluble sulfonic acids, carboxylic acids, and the metal and amine salts thereof. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloalkyl (i.e., naphthenic) groups in the side chains attached to the benzene ring. The alkyl groups in the alkaryl hydrocarbons can be straight or branched chain. The alkaryl radical can be derived from benzene, toluene, ethyl benzene, xylene isomers, or naphthalene.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D-158 Engler: | |
| I.B.P., ° F. | 647 |
| 5, ° F. | 682 |
| 50, ° F. | 715 |
| 90, ° F. | 760 |
| 95, ° F. | 775 |
| F.B.P., ° F. | 779 |
| Refractive index at 23° C. | 1,4900 |
| Viscosity at: | |
| −10° C., centistokes | 2800 |
| 20° C., centistokes | 280 |
| 40° C., centistokes | 78 |
| 80° C., centistokes | 18 |
| Aniline point, ° C. | 69 |
| Pour point, ° F. | −25 |

An example of another hydrocarbon feedstock which is particularly useful in preparing synthetic sulfonic acids is a material referred to as "dimer alkylate." "Dimer alkylate" has a long branched-chain alkyl group. Briefly described, dimer alkylate is prepared by the following steps:

(1) dimerization of a suitable feedstock, such as cat poly gasoline.

(2) alkylation of an aromatic hydrocarbon with the dimer formed in step (1).

Preferably, the dimerization step uses a Friedel-Crafts alkylation sludge as the catalyst. This process and the resulting product are described in U.S. Pat. No. 3,410,925.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbon wherein the alkyl groups contain from 8 to 18 carbon atoms. They are distinguished primarily from the preceding sulfonation feedstocks in that they are straight chain and contain a large amount of di-substituted material. A process of preparing these materials and the resulting product are described in application Ser. No. 529,284, filed Feb. 23, 1966, and now abandoned, and having the same assignee as the present application. The product is also described in U.S. Pat. No. 3,288,716, which is concerned with an additional use for the product, other than sulfonation feedstock. Another process of preparing a di-n-alkaryl product is described in application Ser. No. 521,794, filed Jan. 20, 1966, and now abandoned, and having the same assignee as the present application.

In order to make my disclosure even more complete, application Ser. Nos. 529,284 and 521,794 and Pat. No. 3,410,925 are made a part of this disclosure.

The oil-soluble sulfonic acids are preferred for use in my process.

In addition to the sulfonic acids derived from the foregoing-described hydrocarbon feedstock, examples of other suitable sulfonic acids include the following: mono- and poly-wax-substituted naphthalene sulfonic acid, dinonyl naphthalene sulfonic acid, diphenyl ether sulfonic acid, naphthalene disulfide sulfonic acid, dicetyl thianthrene sulfonic acid, dialauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and poly-chloro-substituted paraffin wax sulfonic acid, nitrosoparaffin wax sulfonic acid; cycloaliphatic sulfonic acid such as lauryl-cyclohexyl sulfonic acid, mono- and poly-wax-substituted cyclohexyl sulfonic acid, and the like.

Suitable carboxylic acids which can be used in preparing the colloidal dispersion used as a starting material in clude naphthenic acids, such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyl-octahydro indene carboxylic acids and the like and oil-soluble salts thereof. Suitable oil-soluble fatty acids are those containing at least 8 carbon atoms. For producing the object of this invention in liquid form, I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable. Examples of commercially available tall oil fatty acids include the "Crofatols," available from Crosby Chemical Company and the "Acintols," available from Arizona Chemical Company.

While in general almost any metal can be used to form the oil-soluble metal sulfonate or oil-soluble metal carboxylate, from a commercial standpoint the metal is restricted to the alkali and alkaline earth metals, with barium being preferred.

Amines which are suitable to form the amine salt of the sulfonic acid or carboxylic acid are those having at least one hydrogen atom attached to the nitrogen. This restricts the amines to primary and secondary amines. In addition the amine should have a molecular weight of at least about 100, preferably at least about 250. Examples of suitable amines include the following:

primary alkylamines, such as n-octylamine,
secondary alkylamines, such as di-n-butylamine,
polyamines, such as hexamethylene-tetramine,
tert. alkyl primary amines, such as tert. octyl amine,
N-alkyl trimethylene diamines, wherein the alkyl group is derived from a fatty acid,
amines having the general formula

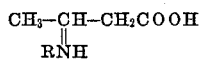

wherein R is an alkyl group derived from a fatty acid.

The preferred amines are those derived from fatty acids since these are commercially available and relatively inexpensive. Moreover, the primary and secondary alkylamines derived from fatty acids are particularly preferred in my invention.

It may be well to mention here that usually commercial sulfonic acids and sulfonates are not 100 percent acid or sulfonate. Instead, they are a mixture of sulfonic acid, or sulfonates with a nonvolatile diluent oil. For example the term "40% active sulfonic acid" refers to a composition containing 40% sulfonic acid.

A wide variety of nonvolatile diluents are suitable in the process of my invention. The principal requisites desired in the nonvolatile diluent are that it will act as a solvent for the dispersing agent which is used and has a boiling point of 160° C. and above. Suitable nonvolatile diluents include materials boiling in the lubricating oil range and lower boiling refinery hydrocarbon streams, such as Stoddard solvent and diesel fuels. Examples of nonvolatile diluents boiling in the lubricating oil range which can be used include mineral lubricating oils obtained by any of the conventional refining procedures; synthetic lubrication oils, such as polymers of propylene, polyoxyalkylenes, polyoxypropylene, dicarboxylic acid esters, and esters of phosphorus; synthetic hydrocarbon lubricating oils, such as dialkylbenzenes, diphenylalkanes, alkylated tetrahydronaphthalenes, and mixtures of these materials; vegetable oils, such as corn oil, cotton seed oil, and castor oil; and animal oils, such as lard oil and sperm oil. Of the nonvolatile diluents described hereinbefore, the mineral lubricating oils and the synthetic lubricating oils are considered more suitable, with the mineral lubricating oils being preferred.

In order to make my disclosure more complete, A.P.I. gravity and distillation ranges for two suitable refinery hydrocarbon streams boiling at 160° C. and above are shown below.

| | Stoddard solvent | No. 2 diesel fuel |
|---|---|---|
| Gravity: °A.P.I. B.P., ° C.| 48 | 36 |
| Initial | 160 | 191 |
| 10% | 168 | 218 |
| 50% | 177 | 259 |
| 90% | 191 | 302 |
| End-point | 210 | 329 |

Suitable basic barium compounds for use in my invention include barium oxide and barium hydroxide, with barium oxide being preferred. Since, probably, a solution of the basic barium compound in the alcohol includes some in situ formed barium alcoholate, it is to be understood that the term basic barium compound includes these materials.

Alcohols which are suitable in my process are those in which the basic barium compound has an appreciable solubility. We have found suitable alcohols to be the following: aliphatic monohydric alcohols having from one to five carbon atoms, and ether alcohols containing three or four carbon atoms.

Specific examples of suitable alcohols include methanol, ethanol, propanol, isopropanol, butanol, isobutanol, pentanols, methoxy ethanol, ethoxy ethanol, and methoxy isopropanol.

The more suitable alcohols for use in my process are methanol, methoxy ethanol and ethoxy ethanol.

The concentration of the basic barium compound in the alcohol can vary over a wide range. Generally it is preferable to use a solution having a concentration approaching maximum solubility in the particular alcohol used, since less storage is required. When using the primary aliphatic alcohols it is particularly desirable to use a fairly concentrated solution since these cannot be used as a process solvent. The maximum solubility of barium oxide in the lower alkanols is about 18.5% (wt.)—expressed as barium. Generally, when using these alcohols the preferable amount of barium oxide corresponds to about 12 to about 16 percent by weight barium.

The solubility of barium oxide in the ether alcohols is greater than in the primary aliphatic alcohols. The maximum solubility is about 30.5 percent by weight as barium. Generally, when using the ether alcohols it is preferable that they have a barium concentration of about 19 to about 25 weight percent.

For some reason a process solvent is desirable in the process of my invention. A primary requisite of the process solvent is that it have a boiling point below 150° C., which is the maximum temperature used in my process. Examples of suitable process solvents include petroleum naphtha, hexane, heptane, octane, benzene, toluene, xylene, and the ether alcohols, defined hereinbefore. In this connection it is of interest that the lower primary aliphatic alcohols are not suitable for use as a process solvent in the instant process.

Amounts of materials used

The amounts of oil-soluble dispersing agent, nonvolatile diluent and basic barium compound are shown in the table below in parts by weight.

| | Suitable | Preferred |
|---|---|---|
| Dispersing agent | 5–55 | 10–30 |
| Nonvolatile | 15–85 | 20–70 |
| Basic compound (as barium) | 10–55 | 20–40 |

The amount of process solvent is at least about 40 percent by weight, preferably at least about 80 percent by weight of the combined amount of dispersing agent nonvolatile diluent, and alcoholic solution of basic barium compound. Usually, the upper amount of process solvent, on the same basis, is below 110 percent by weight. Amounts larger than this can be used but usually are not economically feasible. Stated in another way, the amount of process solvent is at least about 4 parts, preferably at least about 7 parts, by weight per part of total barium compound (as barium) used. Usually, the upper amount of process solvent, stated on this latter-defined basis, is below 9 parts.

The amount of water used is a matter of some importance, and is somewhat dependent upon the amount of barium added initially to the admixture. (The amount of barium added initially is discussed in "Process Conditions.") A suitable amount of water is from about 0.25 to about 3.00 moles per mole of excess (overbasing) barium added. Preferably, the amount of water is from about 0.40 to about 1.6 moles on the same basis. In general, if too little water is used the final product is viscous or semisolid, and sometimes contains gel particles or has a high B.S. and W. On the other hand, if too much water is used the product is usually hazy with a high B.S. and W.

Product produced by my invention

As stated previously herein the product of my invention has a very high base number while still being fluid at ambient temperatures. This is considered an unusual feature when the product uses a nonvolatile diluent boiling in the lubricating oil range. More specifically, the product of my invention suitably has an acetic base number of at least 140, more suitably at least 150, and preferably at least 180. Expressed as metal ratio, my product can have a metal ratio of at least 5:1; usually, it is higher. Still further, the product of my invention can have a base number of at least 140 while always having a viscosity below 1600 centistokes at 100° F., more usually below 800 centistokes at 100° F., and often below 400 centistokes at 100° F. In many instances the product of my invention can have a base number of at least 180 while having a viscosity of below 1600 centistokes at 100° F.

In addition to the foregoing properties the product of my invention is clear (i.e. transmits direct light) and has a good B.S. and W. test (i.e. no sediment on dilution in petroleum naphtha.)

Process conditions

In one manner of conducting the process of my invention an admixture is formed of the oil-soluble dispersing agent, nonvolatile diluent, process solvent and water. When using an aliphatic monohydric alcohol solution of basic barium compounds, preferably the water is not added to the initial admixture until after it is heated. When following the latter-mentioned procedure the temperature of the admixture at the time of adding the water is not important. Usually, it is more convenient to add the water before allowing the admixture to cool.

To the admixture is added the alcoholic solution of basic barium compound. The amount of this solution added at this time is critical in order to obtain a quality product. More specifically, it is the amount of barium which is added that is important. As stated previously herein the concentration of the basic barium compound in the alcohol can vary. Calculated on the basis of the total requirement of barium, the amount which is added suitably is from about 55 to less than about 90 percent, more suitably the amount is from about 60 to less than about 80 percent, and preferably the amount is from about 65 to about 75 percent. This can be illustrated as follows. Assuming a base number of 180 is desired, the equivalent weight of the sulfonic acid (dispersing agent) is known, and a methoxy ethanolic solution of BaO containing 24.0 weight percent Ba is used. The amount of barium required to neutralize the sulfonic acid and provide a base number of 180 is calculated. Then, preferably, the amount of solution added initially contains from about 65 to about 75 percent of the total amount needed.

The need for controlling the amount of barium which is added to the initial admixture can be explained as follows. When the amount of barium is lower than about 55 percent a product is obtained which is viscous, contains visible gel particles, and has a high B.S. and W. value. At the upper end of the range the amount which can be added is affected by the "percent active" of the dispersing agent and the base number of the product. In addition, the amount at the upper range is more critical when using an aliphatic monohydric alcohol solution of basic barium compound. When using an ether alcohol solution of basic barium compound, the amount of this material which is added initially should be less than about 90 percent. when a high base number product is prepared. When using an aliphatic monohydric alcohol solution of basic barium compound, and when a high base number product is being prepared, the amount of the barium in the alcohol solution should be less than about 80 percent of the requirement. Addition of from about 65 to about 75 percent of the barium compound, in alcohol solution, is preferred since either type of alcohol can be used, a high base number product can be prepared, and a wide latitude of other variables is possible. Use of an amount of barium above the amounts defined hereinbefore results in a product which is hazy, opaque, and has a high B.S. and W.

The admixture is then heated to a temperature in the range of about 75 to about 95° C. In some instances, as noted hereinbefore, the water is added after adding the alcoholic solution of basic barium compound.

At this point the admixture is carbonated, preferably by blowing with $CO_2$. The degree of carbonation in this first carbonation is important in that the carbonation should not proceed above about 100%. One means of controlling the degree of carbonation is by using a calculated amount to provide about 100% carbonation of the "free" barium present. (By "free" barium is meant that which is not associated with the dispersing agent.) Another means is to carbonate the admixture until it is acidic to α-naphthol benzein indicator (which has a pH of 8–8.2). When this latter method is employed the carbonation must be closely watched so that it can be stopped immediately after the indicator shows the admixture to be acidic. Generally, slight undercarbonation (e.g. 85 to 99%) is preferred to overcarbonation, since in some cases overcarbonation causes a haze in the final product. The temperature of the admixture during carbonation is important. Suitably the temperature during this first carbonation is from about 75 to about 95° C., preferably from about 85 to about 92° C.

After completion of the first carbonation additional alcoholic solution of basic barium compound is added. The amount added is the remainder of the requirement to produce the desired base number.

The volatile materials present in the admixture are removed by heating. When the temperature of the contents of the reaction vessel reaches about 115° C., blowing with $CO_2$ can be started. (Generally the $CO_2$ blowing is commenced when the temperature is in the range of 115 to 140° C.). Heating and blowing with $CO_2$ are continued concurrently until the volatile materials are removed. The final temperature is not critical. As a matter of routine practice I usually heat to a pot temperature of 150° C. Blowing with $CO_2$ is usually continued for some time at the final temperature. This is to insure complete carbonation of the barium and is not believed to be of any importance in my process. (Overcarbonation is not harmful at this stage in my process.)

In some instances steam-stripping, preferably concurrently with carbonation, is beneficial in my process. More preferably, the steam-stripping is conducted at a temperature above about 140° C. For example, I have observed that occasionally the product is slightly viscous when I have used a lower amount (e.g. 55 to 64% of the requirement) of alcoholic solution. In most cases concurrent $CO_2$ steam-stripping provides a clear, translucent product. On the other hand, when the amount of alcoholic solution of BaO is at the upper range (e.g. above 80%) steam-stripping makes the product worse. In other words a hazy product is made even more hazy.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be constructed as a limitation upon the spirit and scope of the appended claims.

EXAMPLE 1

This example illustrates a laboratory preparation using the preferred conditions and methoxy ethanolic solution of barium oxide.

Materials:                                              Grams
    Sulfonic acid "A" [1] _____ 931
    Sulfonic acid "B" [2] _____ 237
    100 Pale Oil _____ 793
    Methoxy ethanol _____ 2500
    Water _____ 75
    Methoxy ethanolic solution of BaO (24.4% Ba) [3] __ 2340

[1] This acid was derived from a long-chain monoalkylbenzene, prepared by alkylating benzene with an α-olefin. It had the following analysis:
    Total acidity, meq./g. _____ 0.503
    Sulfonic acidity, meq./g. _____ 0.498
    Nonvolatiles, wt. percent _____ 42.1
    Combining weight (as $RSO_3H$) _____ 500
[2] This acid was derived from a "soft bottoms," i.e. the bottoms product resulting from the alkylation of benzene with a chlorinated paraffin. The "soft bottoms" contain a majority of dialkylbenzenes, with diphenylalkanes and other compounds being present. It had the following analysis:
    Total acidity, meq./g. _____ 0.740
    Sulfonic acidity, meq./g. _____ 0.729
    Nonvolatiles, wt. percent _____ 44.2
    Combining weight (as $RSO_3H$) _____ 451
[3] 1800 ml.

Procedure: All of the materials, except the methoxy ethanolic solution of BaO, were added to a 12-liter reaction flask. While employing mechanical agitation the contents of the flask were heated to 45–50° C. Then 1350 ml. (75% of total requirement) of the methoxy ethanolic solution of BaO was added over a one-hour period. Upon completion of the addition the admixture was agitated for one hour. The admixture was then heated to a pot temperature of 90° C., with the volatile materials being removed overhead. Next the admixture was carbonated with gaseous $CO_2$ (~1400 ml./min. for 50 minutes) until the admixture was acidic to α-naphthol benzein indicator. At this point the remainder (450 ml.) of the methoxy ethanolic solution of BaO was added. The solvents were removed by heating to a pot temperature of 150° C. When the temperature reached 120° C., blowing with $CO_2$ (150 ml./min.) was commenced. When the temperature reached 150° C., blowing with $CO_2$ was continued for one hour. The product, which weighed 2124 g., was bright and fluid at ambient temperature. It had the following analysis:

Base No. (acetic) _____ 193
Percent B. S. and W.[1] _____ 0.01
Density, g./ml. _____ 1.272
Percent Ba (calulated from Ba charge and product weight) _____ 26.8
Percent Ba sulfonate (calculated from sulfonic acid acid analysis and product weight) _____ 16.7

[1] Using a procedure substantially the same as ASTM-D-1786-62.

EXAMPLE 2

This example illustrates the necessity of controlling the amount of the alcoholic solution of BaO added initially. A series of runs were made using varying amounts of the alcoholic solution of BaO in the initial addition.

The following materials and amounts were used in all of the runs:

Sulfonic acid "A" [1] _____ 93.1
Sulfonic acid "C" [2] _____ 28.9
100 Pale Oil _____ 81.0
Methoxy ethanol _____ 325

[1] Same as in Example 1.
[2] Similar to Sulfonic acid "B." It was a stripped "NAB Bottoms" as described in application Ser. No. 529,284 and U.S. Pat. No. 3,288,716.

A methanolic solution of BaO, containing 14.8 wt. percent Ba, was used.

The procedure used was substantially the same as in Example 1, except that the water was added at 90° C.

The following table (No. I) shows the other materials, with amounts, reaction conditions and properties of the products. The term "ratio BI" means ratio of barium intermediate added. For example "75/25" means 75% of the alcoholic solution of barium oxide was added initially.

TABLE I

| Run | A | B | C | D | E | F |
|---|---|---|---|---|---|---|
| Materials: | | | | | | |
|   Water, ml | 6.0 | 6.0 | 6.0 | 4.5 | 8.5 | 12.0 |
|   Methanolic BaO, ml | 384 | 3,840 | 3,560 | 384 | 384 | 384 |
| Conditions: | | | | | | |
|   Ratio BI | 80/20 | 75/25 | 73/27 | 80/20 | 65/35 | 50/50 |
|   Base No., target | 205 | 205 | 195 | 205 | 205 | 205 |
|   Moles Ba [1] | 0.380 | 3.80 | 3.49 | 0.380 | 0.380 | 0.380 |
|   Moles water | 0.333 | 3.33 | 3.33 | 0.25 | 0.472 | 0.666 |
|   Ratio water/Ba | 0.88 | 0.88 | 0.95 | 0.66 | 1.24 | 1.75 |
| Product: | | | | | | |
|   Appearance, ambient temp | [2] hazy | [2] bright | [2] bright | [3] | [2] bright | [4] bright |
|   B. S. and W., percent | 5.6 | 0.20 | 0.06 | 4.1 | 0.05 | |
|   Base No. (acetic) | | 206 | | | | |

[1] Moles excess (overbasing) Ba.
[2] (Fluid.)
[3] Slight haze (fluid).
[4] (Viscous.)

EXAMPLE 3

This example illustrates the effect of adding varying amounts of the alcoholic solution of BaO to the initial admixture. A different sulfonic acid, than in Example 2, is used.

Materials

The following materials were used in both runs of this example:

Grams
Sulfonic acid "D" [1] _____ 112.5
100 pale oil _____ 87.0

[1] Sulfonic acid derived from a "NAB" Bottoms. Specifically it was an unstripped bottoms product from the production of "Nalkylene" 500.

Process: The procedure used was substantially the same as in Example 1.

The following tabe (II) shows the other materials used, reaction conditions, and properties of the product.

TABLE II

| Run | A | B |
|---|---|---|
| Material: | | |
| Methoxy ethanol, g | 250 | 306.3 |
| Water, ml | 6.0 | 6.1 |
| Methoxy ethanol solution of BaO (24.2% Ba) g. (ml.) | 232 (180) | 232 (180) |
| Ratio B I | 100/0 | 75/25 |
| Carbonation temperature, °C.: | | |
| First | 90 | 90 |
| Second | 120 | 140 |
| Product: | | |
| Percent Ba, target | 25 | 25 |
| Appearance | (1) | (2) |
| Base No. (acetic) | | 189 |
| Percent Ba, actual (wt.) | | 26.3 |

1 Very hazy.
2 Bright and fluid.

EXAMPLE 4

This example illustrates the use of an amine salt of a sulfonic acid in conjunction with adding varying amounts of a methoxy ethanolic solution of BaO to the initial admixture.

Materials

The following materials were used in all of the runs of this example.

|  | Grams |
|---|---|
| Sulfonic acid "D" [1] | 69.5 |
| 100 pale oil | 87.0 |
| Methoxy ethanol | 306.3 |
| Amine [2] | 14.5 |
| Water, ml. | 7.5 |

[1] Same as in Example 3.
[2] "Armeen" T (a saturated primary fatty amine, molecular weight about 263, available from Armour and Co.)

Process: The procedure used was substantially the same as in Example 1.

The following Table (III) shows the other materials used, amounts, reaction conditions and properties of the products.

TABLE III

| Run | A | B | C | D | E |
|---|---|---|---|---|---|
| Material: | | | | | |
| Methoxy ethanolic solution of BaO (24.2% Ba) (grams-ml.) | 286-220 | 286-200 | 286-220 | 286-220 | 286-220 |
| Vol percent, first addition | 61 | 71 | 75 | 75 | 82 |
| Carbonation temperature, °C.: | | | | | |
| First | 90 | 90 | 90 | 90 | 90 |
| Second | 150 | 150 | 150 | 140 | 150 |
| Product: | | | | | |
| Percent Ba, target | 30 | 30 | 30 | 30 | 30 |
| Appearance | (1) | (1) | (2) | (2) | (3) |
| Base No. (acetic) | | | 236 | 238 | |
| Percent Ba, actual (wt.) | | | 29.5 | 29.6 | |

1 Viscous liquid.
2 Bright fluid.
3 Opaque fluid.

EXAMPLE 5

This example shows that a variety of sulfonic acids can be used in the process of my invention. The sulfonic acids employed in the runs of this example were the following:

Sulfonic acid A—same as in Example 1
Sulfonic acid B—same as in Example 1
Sulfonic Acid E—a mixture of 70% sulfonic acid from dimer alkylate, described hereinbefore, and 30% sulfonic acid derived from "NAB Bottoms," similar to Sulfonic acid C in Example 2
Sulfonic Acid F—derived from "NAB Bottoms"—similar to Sulfonic Acid C in Example 2
Sulfonic Acid G—derived from dimer alkylate The properties of Sulfonic Acids A and B are given in Example 1.

The properties of Sulfonic Acids C, D, and E are shown below.

| Sulfonic Acid | C | D | E |
|---|---|---|---|
| Total acidity, meq./g | 0.597 | 0.654 | 0.664 |
| Sulfonic acidity, meq./g | 0.569 | 0.636 | 0.626 |
| Nonvolatiles, wt. percent | 44.2 | 27.8 | 39.3 |
| Combining weight (as $RSO_3H$) | 445 | 443 | 457 |

The procedure was substantially the same as in Example 1. As in Example 1, 75% of the total requirements of the solution of BaO was added to the initial admixture. The total amount of the methoxy ethanol solution added was 234 g. (180 ml.) in all runs.

TABLE IV

| Run Number | A | B | C | D | E |
|---|---|---|---|---|---|
| Materials: | | | | | |
| Sulfonic Acid: | | | | | |
| A, g | | | 93.1 | | |
| B, g | 94.3 | 23.7 | | | |
| C, g | | | 122.2 | | |
| D, g | | | | 110.0 | |
| E, g | | | | | 116.2 |
| 100 Pale oil | 89.7 | 79.3 | 73.3 | 96.3 | 84.0 |
| Methoxy ethanol | 250 | 250 | 250 | 250 | 250.0 |
| Water, ml | 7.5 | 7.5 | 7.5 | 4.5 | 7.5 |
| Product: | | | | | |
| Appearance | (1) | (1) | (1) | (1) | (1) |
| Crude product, g | 208.2 | 207.9 | 212.0 | 213.2 | 231.0 |
| Base No., acetic | 196 | 199 | 200 | 192 | |
| B. S. and W | Trace | 0.5 | Trace | 0.06 | 3.0 |
| Viscosity, at 210° F., cs | 13.31 | 19.2 | 36.89 | 32.66 | |

1 Bright fluid.

EXAMPLE 6

This example shows (1) the use of a mixture of sulfonic acid and tall oil fatty acid and (2) the effect of varying amounts of water.

The following materials were used in all of the runs:

|  | Grams |
|---|---|
| Sulfonic acid "D," g.[1] | 69.5 |
| 100 Pale Oil, g. | 87.0 |
| Methoxy ethanol, g. | 250 |
| Tall oil fatty acid [2] | [3] 14.5 |
| Methoxy ethanol solution of BaO (24.4% Ba), g. | [4] 234 |

[1] Same as in Example 3.
[2] Crofatol 5—available from Crosby Chemical Co.
[3] With the exception of Run E which used 10 grams tall oil fatty acid and 4.5 grams of an n-alkyl trimethylene diamine available from Armour and Co.
[4] 180 ml.

The procedure was substantially the same as in Example 1, with 75% of the solution of BaO being added to the initial admixture. The carbonation temperature was the same in all runs—90° C. in first carbonation and 120° C. beginning of second carbonation. The amount of $CO_2$ was the same in all runs.

The following Table V shows the amounts of water used and the appearance and analyses of the products.

TABLE V

| Run | A | B | C | D | E |
|---|---|---|---|---|---|
| Water, ml | 4.0 | 6.0 | 8.0 | 10.0 | 4.5 |
| Moles water/mole Ba | 0.54 | 0.80 | 1.08 | 1.33 | 0.60 |
| Product: | | | | | |
| Appearance | (1) | (1) | (1) | (1) | (1) |
| Analysis | | | | | |
| Base No. (acetic) | | 198 | 204 | | 204 |
| Viscosity, 210° F., cs | 30.07 | 18.22 | 20.35 | 86.01 | 16.01 |
| Percent B. S. and W | 0.02 | 0.05 | 0.03 | 0.03 | 0.02 |

1 Bright fluid.

Inspection of the data in Table V indicates that the optimum amount of water appears to be from 0.80 to 1.08 moles $H_2O$/mole Ba. Viscosity is lowest at this point. B.S. and W. does not appear to be affected.

EXAMPLE 7

This example shows the process of my invention employing triple addition of the alcoholic solution of BaO. In other words it shows that nearly 85% of the Ba requirement can be added at 90° C. if the addition and carbonation is done in two stages at 90° C. With one stage addition and carbonation we were limited to less than 80% addition of the Ba requirement at 90° C.

Materials

| | |
|---|---:|
| Sulfonic acid A, g.[1] | 93.1 |
| Sulfonic acid B, g.[1] | 23.7 |
| 100 Pale oil, g. | 79.3 |
| Water, ml. | 7.5 |
| Methoxy ethanol, g. | 250 |

[1] Same as in Example 1.

Procedure: The above-listed materials were added to a one-liter reaction flask. While employing mechanical agitation the admixture was heated to 45–50° C. Thereupon, 165 ml. of a methoxy ethanolic solution of BaO (24.4% Ba)—63.5% of the total requirement—were added to the reaction flask. The resulting admixture was heated to 90° C. whereupon it was blown with $CO_2$ gas until it was acidic to $\alpha$-naphthol benzein indicator. At this point, 55 ml. (21.1%) of the methoxy ethanolic solution of BaO were added, following by blowing with $CO_2$ gas. A third addition (40 ml.—15.4%) of the methoxy ethanolic solution of BaO was made to the reaction flask, followed by heating the reaction mass to 120° C. Blowing with $CO_2$ was started at this point. The heating to remove the solvents and $CO_2$ blowing were conducted currently until a pot temperature of 150°–155° C. was reached. While maintaining the pot temperature at 150° C. blowing with $CO_2$ was continued for 30 minutes.

The product (240.9 g.) was bright and fluid and had an acetic base number of 257.

EXAMPLE 8

This example illustrates the effect of steam stripping as a final step in the process of my invention. For reason of convenience simulated steam-stripping was employed. The simulated seam-stripping was accomplished by adding water to the material and heating at 150° C.

Run A

Product "A" of Table III was treated in this run. In the process used to prepare this particular product, 61 percent of the total barium requirement was added initially. The product originally was quite viscous and gel-like. It was treated by adding 2.0 ml. of water dropwise, while blowing concurrently with $CO_2$ (temperature—150° C.). The material became quite fluid, after which it was blown with $CO_2$ for an additional 30 minutes. The product was bright and fluid at ambient temperature, and had a B.S. and W. of 0.08%.

Run B

Product "F" of Table I was treated in this run. In the process used to prepare this product, 50 percent of the total barium requirement was added initially. Originally, the product was quite viscous. It was treated by adding 3.0 ml. of water dropwise while blowing with $CO_2$ (temperature—150° C.). The product became fluid, and was blown with $CO_2$ for an additional 15 minutes. The final product was fluid but contained solid particles. It had a B.S. and W. of 36%.

Run C

Product "D" of Table I was treated in this run. In the process used to prepare this product, 80 percent of the total barium requirement was added initially. The untreated product had a slight haze and a B.S. and W. of 4.1%. The product was treated by adding it to a reaction flask and heating to 150° C. To the flask 2.0 ml. of water was added dropwise while blowing with $CO_2$. Upon completion of the water addition, the product was blown with $CO_2$ for an additional 30 minutes. The treated product had a haze and a B.S. and W. of 5.8%.

EXAMPLE 9

This example illustrates a plant-size preparation using the preferred process conditions and a methanolic solution of BaO having an acetic base number of 122.7.

The dispersing agent was a 60/40 blend of Sulfonic Acids "A" and "B," which are described in Example 1. The combined acid had the following analysis:

| | |
|---|---:|
| Total acidity, meq./g. | 0.505 |
| Sulfonic acidity, meq./g. | 0.477 |
| Nonvolatiles, wt. percent | 34.1 |
| Combining weight (as $RSO_3H$) | 470 |

The following materials were added to the reaction vessel:

| | Gal. |
|---|---:|
| Sulfonic acid | 3536 |
| 100 Pale Oil | 1880 |
| Methoxy ethanol | 6127 |

After heating the admixture to 112° F., 4600 gallons of the methanolic solution of BaO were added to the reaction vessel, while maintaining the temperatures between 112 and 118° F. After completely mixing the materials in the reactor, the reaction mass was transferred to a still (distillation unit equipped with mechanical mixing) and the volatiles were taken overhead to a temperature of 195° F. Water (120 gallons) was then added to the still. This was followed by blowing the reaction mass with $CO_2$, at a rate of 30±1 lb./min., for 54 minutes while maintaining the reaction mass at 195–200° F. (This amount of $CO_2$ was sufficient to convert from 90 to 100% of the excess barium present to barium carbonate.) Then, 1446 gallons of the methanolic solution of BaO (the remainder of the total requirement) were added to the still. The contents of the still were heated to 245° F. removing volatiles. Blowing with $CO_2$ was started at this point and continued while increasing the temperature to 300° F. The product was then blown with $CO_2$ (15 lbs./min.) for about two hours while maintaining the pot temperature at 300–315° F. During this two hour period the product was also treated with steam. The steam treating was conducted by introducing steam for a 1 to 5 minute period at 15 to 30 minute intervals. (The total steam treating time was 14 minutes.) Then the product was blown with nitrogen gas for one hour at 300–310° F. The product was then transferred to storage while the temperature was 270° F.

The product was bright and fluid and had the following analysis:

| | |
|---|---:|
| Base number (acetic) | 166 |
| Percent active | 17.4 |
| Percent barium | 22.4 |

EXAMPLE 10

This example illustrates a laboratory preparation of a highly basic barium-containing dispersion wherein Stoddard solvent was the nonvolatile diluent.

| Materials: | Amount |
|---|---|
| Sulfonic Acid "A"[1] grams | 62.5 |
| Sulfonic Acid "B"[2] do | 42.1 |
| Stoddard solvent do | 250 |
| Methoxy ethanol do | 325 |
| Water ml | 7 |
| Methanolic solution of barium oxide (14.8 wt. percent Ba) ml | 340 |

[1] Hexane solution of a sulfonic acid prepared from a long-chain monoalkylbenzene, which was prepared by alkylating benzene with an α-olefin. The solution had the following analysis:
   Total acidity, meq./g. _____ 0.591
   Sulfonic acidity, meq./g. _____ 0.535
   Nonvolatiles, wt. percent _____ 35.7
   Combining weight (as $RSO_3H$) _____ 500
[2] Hexane solution of a sulfonic acid prepared from a "soft bottoms" alkylate (this term is described in Example 1. The solution had the following analysis:
   Sulfonic acidity, meq./g. _____ 0.662
   Nonvolatiles, wt. percent _____ 38.5
   Combining weight (as $RSO_3H$) _____ 450

Procedure: The hexane solution of sulfonic acids, Stoddard solvent and methoxy ethanol were added to a 2-liter reaction flask. While using mechanical agitation, the admixture was heated to 45–50° C., whereupon 245 ml. of the methanolic solution of BaO were added over a 15 minute period. The resulting admixture was heated to 90° C. and the water was added. While mixing, the total admixture was blown with $CO_2$ gas (265 ml./min.) for 18 minutes, with the temperature of the admixture at 90–92° C. At the end of the $CO_2$ blowing, 95 ml. of the methanol solution of BaO (the remainder) were added to the reaction flask. The reaction main was heated to 120° C., removing a portion of the volatile materials. While the temperature was at 120° C. and reaction admixture was blown with $CO_2$ gas (190 ml./min.) for 10 minutes while maintaining the temperature at 120–122° C. While containing blowing with $CO_2$ the reaction admixture was heated to 150° C. to remove substantially all of the volatile materials. While maintaining the temperature at 150° C. the reaction main was blown with $CO_2$ gas (265 ml./min.) for about 20 minutes. The product weighed 192.6 grams and was bright and fluid at ambient temperatures. The product had the following analysis:

| Base number (acetic) | 194 |
|---|---|
| Barium, weight percent | [1]24 |
| B.S. and W. | 0.04 |
| Viscosity, at 100° F., cs. | 19.07 |
| Percent active (sulfonate) | 23 |

[1] Actual.

EXAMPLE 11

This example illustrates a laboratory preparation of a highly basic barium-containing dispersion wherein No. 2 Diesel fuel was the nonvolatile diluent.

| Materials: | Amount |
|---|---|
| Sulfonic Acid "A"[1] grams | 62.5 |
| Sulfonic Acid "B"[1] do | 42.1 |
| No. 2 Diesel fuel do | 125 |
| Methoxy ethanol do | 325 |
| Water ml | 7 |
| Methanolic solution of barium oxide (14.8 wt. percent Ba) ml | 340 |

[1] The acids were the same as in Example 10.

Procedure: The procedure was the same as in Example 10 with the exception of the following minor change. While the temperature was at 150° C. the product was blown with $CO_2$ gas (1,000 ml./min.) for 30 minutes. The product weighed 229.1 grams and was bright and fluid at ambient temperatures. The product had the following analysis:

| Base number (acetic) | 165 |
|---|---|
| Barium, weight percent | [1]21.5 |
| B.S. and W. | 0.06 |
| Viscosity, at 100° F., cs. | 23.69 |

[1] Calculated.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A process for preparing a highly basic barium-containing dispersion having an acetic base number of at least 140 and a viscosity below 1600 centistokes at 100° F., wherein the process comprises:
   (a) forming an admixture consisting essentially of:
      (i) about 5 to about 55 parts by weight oil-soluble dispersing agent selected from the group consisting of sulfonic acids, carboxylic acids, and salts thereof,
      (ii) about 15 to about 85 parts by weight nonvolatile diluent having a boiling point of 160° C. and above,
      (iii) an organic process solvent boiling below 150° C.,
      (iv) water,
   (b) adding to the admixture of step (a) an alcoholic solution of basic barium compound, wherein the alcohol is selected from the group consisting of ether alcohols containing 3 or 4 carbon atoms, and aliphatic monohydric alcohols containing 1 to 5 carbon atoms, said alcoholic solution of basic barium compound being in an amount to provide from about 55 to less than about 90 percent of the total amount of barium required,
   (c) passing $CO_2$ through the admixture while maintaining the temperature of the admixture in the range of about 75 to about 95° C., the amount of $CO_2$ being not more than 100% of the amount required to convert the excess basic barium compounds to barium carbonate,
   (d) adding to the carbonated admixture of step (c) an additional amount of said alcoholic solution of basic barium compound, wherein the amount is the remainder of the requirement,
   (e) removing volatile materials, and
   (f) carbonating the admixture at temperatures which are higher than the first carbonation temperature, said process being characterized further in that:
      (1) the amount of process solvent in step (a) (iii) is at least about 40 percent by weight of the weight of dispersing agent, nonvolatile diluent, and alcoholic solution of basic barium compound,
      (2) the amount of water is from about 0.25 to about 3.0 moles per mole of overbasing barium employed.

2. The process of claim 1 wherein the process solvent is selected from the group consisting of petroleum naphtha, hexane, heptane, octane, benzene, toluene, xylene, and ether alcohols containing 3 or 4 carbon atoms.

3. The process of claim 2 wherein the nonvolatile diluent is selected from the group consisting of mineral lubricating oils and synthetic lubricating oils.

4. The process of claim 3 wherein the process solvent is methoxy ethanol.

5. The process of claim 4 wherein the alcoholic solution of basic barium compound is a methoxy ethanol solution of barium oxide.

6. The process of claim 5 wherein the oil-soluble dispersing agent is a sulfonic acid.

7. The process of claim 4 wherein the alcoholic solution of basic barium compound is a methanolic solution of barium oxide.

8. The process of claim 7 wherein the oil-soluble dispersing agent is a sulfonic acid.

9. The process of claim 8 wherein the amount of methanolic solution of barium oxide added in step (b) provides from about 60 to less than about 80 percent of the total amount of barium required.

10. The process of claim 9 characterized as having the additional step of steam stripping the product.

11. A process for preparing a barium-containing dispersion, said dispersion being fluid at ambient temperature and having an acetic base number of at least 140, said process comprising:
   (a) forming an admixture consisting essentially of:
      (i) about 10 to about 30 parts by weight of an oil-soluble dispersing agent selected from the group consisting of sulfonic acids, carboxylic acids, metal sulfonates, metal carboxylates, and amine sulfonates,
      (ii) about 20 to about 70 parts by weight of a non-volatile diluent having a boiling point of 160° C. and above,
      (iii) a process solvent selected from the group consisting of petroleum naphtha, hexane, heptane, octane, benzene, toluene, xylene and ether alcohols containing 3 or 4 carbon atoms,
      (iv) water,
   (b) adding to the admixture of step (a) an alcoholic solution of barium oxide, wherein the alcohol is methanol or methoxy ethanol, said alcoholic solution of barium oxide being in an amount to provide from about 60 to less than about 80 percent of the total barium required to provide the desired base number,
   (c) passing $CO_2$ through the admixture while maintaining the temperature of the admixture in the range of about 75 to about 95° C., the amount of $CO_2$ being not more than about 100% of the amount required to convert the excess barium oxide to barium carbonate,
   (d) adding to the carbonated admixture of step (c) an additional amount of said alcoholic solution of barium oxide, wherein the amount is the remainder of the requirement to provide the desired base number,
   (e) removing volatile materials,
   (f) carbonating the admixture while the pot temperature is maintained in the range of about 115° C. to about 150° C., said process being characterized further in that:
      (1) the amount of process solvent in step (a) is at least about 40 percent by weight of the weight of dispersing agent, nonvolatile diluent, and alcoholic solution of barium oxide,
      (2) the amount of water is from about 0.40 to about 1.6 moles per mole of overbasing barium employed.

12. The process of claim 11 wherein the oil-soluble dispersing agent is a sulfonic acid.

13. The process of claim 12 wherein the nonvolatile diluent oil is a mineral lubricating oil.

14. The process of claim 13 wherein the process solvent is methoxy ethanol.

15. The process of claim 14 wherein the amount of alcoholic solution of barium oxide added in step (b) provides from about 65 to about 75 percent of the total amount of barium required.

16. The process of claim 15 wherein the carbonation of step (c) is conducted while maintaining the temperature of the admixture in the range of about 85° C. to about 92° C.

17. The process of claim 16 wherein the alcoholic solution of barium oxide is a methanolic solution of barium oxide.

18. The process of claim 17 wherein the alcoholic solution of barium oxide is a methoxy ethanolic solution of barium oxide.

19. The process of claim 17 characterized as having the additional step of steam stripping the product.

20. The process of claim 18 characterized as having the additional step of steam stripping the product.

21. A process for preparing a barium-containing dispersion having an acetic base number of at least 140 and a viscosity below 1600 centistokes at 100° F., wherein the process comprises:
   (a) forming an admixture of
      (i) about 5 to about 55 parts by weight oil-soluble dispersing agent selected from the group consisting of sulfonic acids, carboxylic acids, metal sulfonates, metal carboxylates, and amine sulfonates,
      (ii) about 15 to about 85 parts by weight non-volatile diluent having a boiling point of 160° C. and above,
      (iii) a process solvent which is an ether alcohol containing 3 or 4 carbon atoms,
   (b) adding to the admixture of step (a) an alcoholic solution of basic barium compound, wherein the alcohol is an aliphatic monohydric alcohol having 1 to 5 carbon atoms, said alcoholic solution of basic barium compound being in an amount to provide from about 55 to less than 80 percent of the total amount of barium required,
   (c) heating the admixture to about 75° C. to about 95° C.,
   (d) adding water to the admixture,
   (e) passing $CO_2$ through the admixture, while maintaining the temperature of the admixture in the range of about 75° C. to about 95° C., the amount of $CO_2$ being not more than about 100% of the amount to convert the excess basic barium compound to barium carbonate,
   (f) adding to the carbonated admixture of step (e) an additional amount of said alcoholic solution of basic barium compound, wherein the amount is the remainder of that required to produce the desired base number,
   (g) removing volatile materials, and
   (h) carbonating the admixture at temperatures which are higher than the first carbonation temperature, said process being further characterized in that:
      (1) the amount of process solvent in step (a) (iii) is at least 40 percent by weight of the weight of dispersing agent, non-volatile diluent, and alcoholic solution of basic barium compound, and
      (2) the amount of water is from about 0.25 to about 3.0 moles per mole of overbasing barium employed.

22. The process of claim 21 wherein the alcoholic solution of basic barium compound is a methanolic solution of barium oxide.

23. The process of claim 22 wherein the oil-soluble dispersing agent is a sulfonic acid.

24. The process of claim 23 wherein the non-volatile diluent is a mineral lubricating oil.

25. The process of claim 24 wherein the process solvent of step (a)(iii) is methoxy ethanol.

26. The process of claim 25 wherein the amount of water is from about 0.40 to about 1.6 moles per mole of overbasing barium employed.

27. The process of claim 26 wherein the carbonation of step (e) is conducted while maintaining the temperature of the admixture in the range of about 85° C. to about 92° C.

28. The process of claim 27 characterized as having the additional step of steam stripping the product.

29. The process of claim 28 wherein the amount of methanolic solution of barium oxide in step (b) provides from about 65 to about 75 percent of the total amount of barium required.

30. The process of claim 29 characterized as having the additional step of steam stripping the product.

31. A process for preparing a highly basic barium-containing dispersion having an acetic base number of at least 140 and a viscosity below 1600 centistokes at 100° F., wherein the process comprises:
(a) forming an admixture consisting essentially of:
  (i) about 5 to about 55 parts by weight oil-soluble dispersing agent which is a sulfonic acid or a metal salt of a sulfonic acid,
  (ii) about 15 to about 85 parts by weight non-volatile diluent which is a refinery hydrocarbon stream having a boiling point of 160° C. and above,
  (iii) a process solvent which is an ether alcohol containing three or four carbon atoms,
  (iv) water,
(b) adding to the admixture of step (a) an alcoholic solution of basic barium compound, wherein the alcohol is methanol or methoxy ethanol, said alcoholic solution of basic barium compound being in an amount to provide from about 55 to less than about 90 percent of the total amount of barium required,
(c) passing $CO_2$ through the admixture while maintaining the temperature of the admixture in the range of about 75 to about 95° C., the amount of $CO_2$ being not more than 100% of the amount required to convert the excess basic barium compounds to barium carbonate,
(d) adding to the carbonated admixture of step (c) an additional amount of said alcoholic solution of basic barium compounds, wherein the amount is the remainder of the requirement,
(e) removing volatile materials, and
(f) carbonating the admixture at temperatures which are higher than the first carbonation temperature, said process being characterized further in that:
  (1) the amount of process solvent in step (a)(iii) is at least about 40 percent by weight of the weight of dispersing agent, nonvolatile diluent, and alcoholic solution of basic barium compound,
  (2) the amount of water is from about 0.25 to about 3.0 moles per mole of overbasing barium employed.

32. The process of claim 31 wherein the process solvent is methoxy ethanol.

33. The process of claim 32 wherein the non-volatile diluent is Stoddard solvent.

34. The process of claim 32 wherein the non-volatile diluent is diesel fuel.

References Cited

UNITED STATES PATENTS

| | | | |
|---|---|---|---|
| 3,537,996 | 11/1970 | Hoist et al. | 252—33 |
| 2,865,956 | 12/1958 | Ellis et al. | 252—33 |
| 3,014,866 | 12/1961 | Fern | 252—33 |
| 3,415,632 | 12/1968 | Rechberger | 252—33 |
| 3,471,403 | 10/1969 | Le Suer et al. | 44—51 |
| 3,501,279 | 3/1970 | Allen et al. | 44—51 |

PATRICK P. GARVIN, Primary Examiner

I. VAUGHN, Assistant Examiner

U.S. Cl. X.R.

44—51, 57, 66, 70, 76; 252—39